United States Patent
Lee

(10) Patent No.: US 8,620,292 B2
(45) Date of Patent: Dec. 31, 2013

(54) CONTROLLING MOBILE STATION RESPONSE TO A COMMON RATE CONTROL COMMAND

(75) Inventor: Jung Ah Lee, Pittstown, NJ (US)

(73) Assignee: Alcatel Lucent, Paris (FR)

( * ) Notice: Subject to any disclaimer, the term of this patent is extended or adjusted under 35 U.S.C. 154(b) by 2045 days.

(21) Appl. No.: 11/228,721

(22) Filed: Sep. 16, 2005

(65) Prior Publication Data
US 2007/0066335 A1   Mar. 22, 2007

(51) Int. Cl.
*H04M 3/00* (2006.01)
(52) U.S. Cl.
USPC ........... 455/418; 455/450; 455/522; 370/229; 370/231
(58) Field of Classification Search
USPC .......................... 455/418, 522; 370/229, 231
See application file for complete search history.

(56) References Cited

U.S. PATENT DOCUMENTS

| | | | |
|---|---|---|---|
| 7,466,669 B2 * | 12/2008 | Hosein | 370/310 |
| 2004/0259560 A1 * | 12/2004 | Hosein et al. | 455/452.1 |
| 2005/0201280 A1 * | 9/2005 | Lundby et al. | 370/229 |
| 2006/0045013 A1 * | 3/2006 | Vannithamby et al. | 370/231 |
| 2006/0274689 A1 * | 12/2006 | Li et al. | 370/329 |

OTHER PUBLICATIONS

3rd Generation Partnership Project; Technical Specification Group Radio Access Network; FDD Enhanced Uplink: Overall Description; Stage 2 (Release 6) (34 pages).
R2-050941; Title: SHO Load Control for EDCH (7 pages).
R2-051444; Title: RGCH Step Sizes (4 pages).
R2-050786; Title: Consideration of E-DCH Scheduling Step Sizes (3 pages).
R2-051483; Title: RG Step size (1 page).

* cited by examiner

Primary Examiner — Liton Miah
(74) Attorney, Agent, or Firm — Carlson, Gaskey & Olds, P.C.

(57) ABSTRACT

A wireless communication system (20) includes an overload control technique that comprises selectively controlling whether a mobile station (30-40) will respond to a common rate control command. In a disclosed example, a statistical rate control is used such that each mobile station responds to the relative grant based upon a probability that the mobile station should respond. A disclosed example includes selecting two control parameters that influence the probability that a mobile station will respond. The probability in one example is dependent on the data rate currently being used by the mobile station when receiving the relative grant.

11 Claims, 2 Drawing Sheets

CONTROLLING MOBILE STATION RESPONSE TO A COMMON RATE CONTROL COMMAND

FIELD OF THE INVENTION

This invention generally relates to telecommunications. More particularly, this invention relates to wireless communication systems.

DESCRIPTION OF THE RELATED ART

Wireless communication systems are well known and in widespread use. Typical arrangements include a plurality of base stations arranged to provide wireless service coverage over a selected geographic region. A variety of controls are required to ensure appropriate signal processing and to avoid interference at the base stations, for example. One type of control is known as soft-handoff overload control. Known arrangements include generating signals and transmitting them to mobile stations indicating a desire for a mobile station to decrease the power used by the mobile station on an uplink. Such control signals take a variety of forms.

In some instances, an overload control signal will be sent by a base station that is not rate controlling one or more mobile stations with which the base station is communicating. Such a base station is referred to as a non-serving base station. Rate control commands from a non-serving base station are referred to as non-serving commands. One such command is known as a relative grant. The relative grant command can be 'STEP_UP' or 'STEP_DOWN' indicating that mobiles can increase or decrease the transmission rate relative to the current rate.

It is known to send non-serving relative grants to each mobile station on an individual mobile station basis. This approach tends to use up an undesirably large amount of downlink resources. Another approach is to send a single non-serving relative grant to a plurality of mobile stations. This approach reduces downlink signaling overhead. There is a potential problem, however, when all mobile stations receiving the non-serving relative grant respond to it by a fixed amount. One potential problem is a relatively large fluctuation in cell loading if common non-serving relative grant is transmitted and all mobile stations respond by reducing the allowed transmit power (e.g., serving grant) by a pre-configured amount (e.g., in dB) when an overload condition exists.

For example, consider a system that is operating near capacity with a RoT target of 7 dB. Assume that 40% of the E-DCH resource is consumed by non-serving E-DCH users. If all soft-handoff (SHO) users are transmitting with a low rate with a transport block size of 690 bits and an overload condition occurs, all non-serving users respond to the non-serving relative grant by stepping down the serving grant at the next transmission opportunity. In one example, this includes reducing the transport block size from 690 bits to 354 bits and the TPR is reduced by approximately 3 dB. The total received power after applying the non-serving relative grant may be reduced by as much as 1 dB. Such a fluctuation may be too large for many circumstances, especially when the cell is in overload by a small margin. When larger numbers of mobile stations are in soft handoff, an even larger fluctuation in the interference level may result.

Large fluctuations in received power should be prevented to avoid unnecessarily reducing mobile station transmit power. If the RoT is reduced by too much, the scheduler will schedule more in-cell users, in an attempt to increase the RoT back to the target value. Another reason to avoid large fluctuations is that the reduction in RoT by as much a 1 dB can result in approximately a ten to fifteen percent reduction in aggregate cell throughput.

There is a need for an improved rate control technique that allows for conserving downlink resources while avoiding undesirably large fluctuations in received power. This invention addresses that need.

SUMMARY OF THE INVENTION

An exemplary disclosed method of communicating includes selectively controlling whether a mobile station will respond to a common rate control command that is transmitted to a plurality of mobile stations.

One example includes controlling a probability that the mobile station will respond to the common rate control command.

In one example, the probability comprises $P(r)=K\exp(-r/\mu)-K\exp(-R_{max}/\mu)$ where r is an uplink data rate of the mobile station, $R_{max}$ corresponds to the transmission data rate for the mobile, $\mu$ is a parameter that controls how quickly mobile stations respond to the common rate control command and $K=1/(1-\exp(-R_{max}/\mu))$.

One example includes selecting $R_{max}$ and $\mu$ to achieve a desired rate of response by mobile stations receiving the common rate control command. By selectively controlling at least one parameter of the common rate control command, mobile station responses can be controlled to avoid undesirably large fluctuations in cell interference levels.

One example common rate control command is a common non-serving relative grant.

One example includes selectively responding to a received common rate control command such as a non-serving relative grant.

Another example includes transmitting a common rate control command having at least one value selected for at least one parameter that is used for determining a probability that a mobile station will respond to the common rate control command.

The various features and advantages of this invention will become apparent to those skilled in the art from the following detailed description. The drawings that accompany the detailed description can be briefly described as follows.

DETAILED DESCRIPTION

This invention provides improved rate control by selectively controlling how mobile stations respond to a common rate control command transmitted from a base station and received by a plurality of mobile stations. One example common rate control command is a common non-serving relative grant. The following description uses a common non-serving relative grant as an example for discussion purposes.

A disclosed example includes controlling a probability that a mobile station will respond to the non-serving relative grant by controlling at least one parameter of the probability distribution function. In one example, each mobile station determines a probability of responding to the relative grant and responds if a uniform random number between 0 and 1 is below a threshold determined by the probability.

Figure 1:
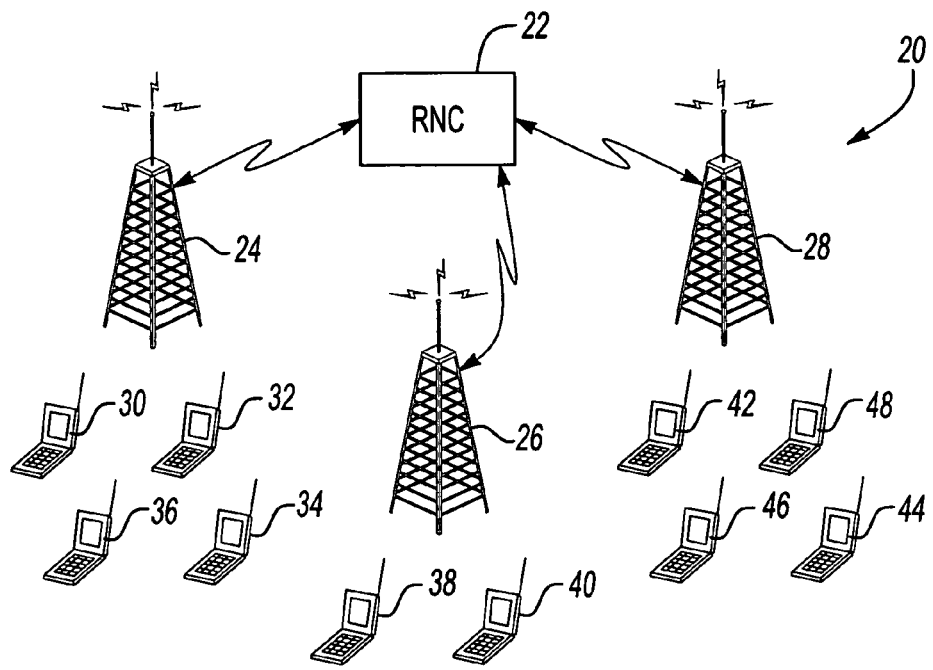
FIG. 1 schematically illustrates selected portions of a wireless communication system that is useful according to one embodiment of this invention.

FIG. 1 schematically shows selected portions of a wireless communication system. A radio network controller (RNC) 22 communicates in a generally known manner with a plurality of base stations 24, 26 and 28. The base stations comprise known components in one example. The base stations are arranged in a known manner to provide wireless communication coverage over a selected geographic region, for example.

In the illustrated example, a plurality of mobile stations 30, 32, 34 and 36 are rate controlled by the base station 24. A plurality of mobile stations 38 and 40 are rate controlled by the base station 26. Another plurality of mobile stations 42, 44, 46 and 48 are rate controlled by the base station 28.

For purposes of discussion, an SHO overload condition exists at the base station 26. It is desirable to transmit a rate down relative grant signal to the non-serving mobile stations from the base station 26. In this example, the plurality of mobile stations 30-36 and the plurality of mobile stations 42-48 receive a common non-serving relative grant transmission from the base station 26. The disclosed example provides the advantage that not every one of those mobile stations will respond to the non-serving relative grant even though each of them receives the relative grant transmission. By controlling how the mobile stations respond to the relative grant, the disclosed example provides an improvement in rate control compared to previous arrangements where every mobile station receiving a common relative grant responds to it by reducing the mobile station's transmission rate.

Figure 2:
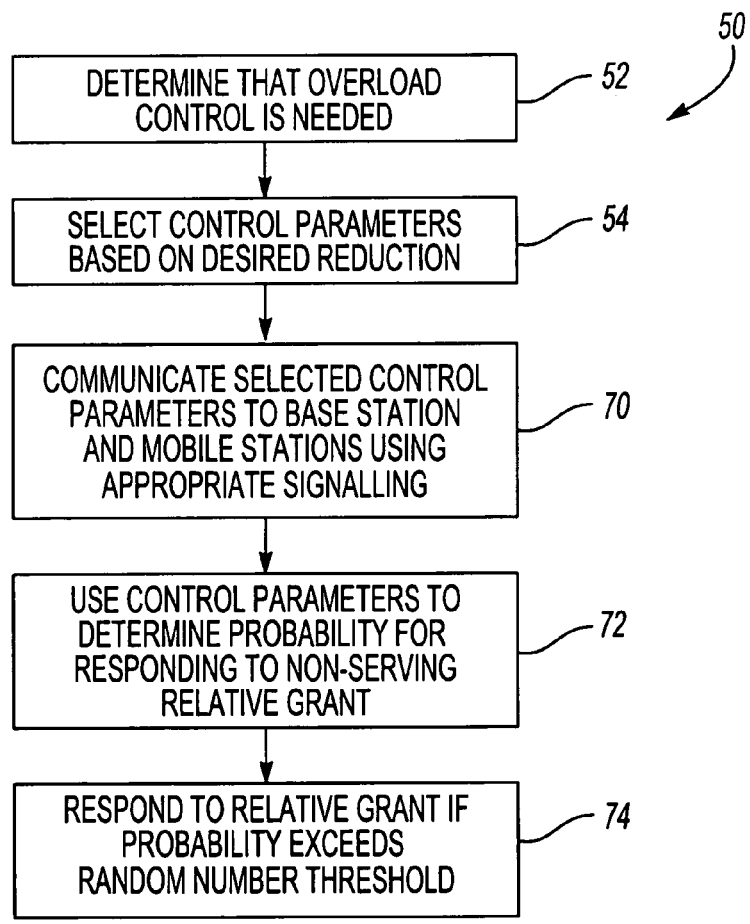
FIG. 2 is a flowchart diagram summarizing one example approach designed according to an embodiment of this invention.

Referring to FIG. 2, a flowchart 50 includes a step at 52 where an appropriate portion of the wireless communication system 20 determines that an overload control is needed. In this example, the base station 26 is experiencing an overload condition. At 54, the system 20 selects control parameters based on a desired power reduction. For example, if the overload condition is relatively minor, the control parameters are selected to achieve a response by mobile stations that will bring the interference level below the overload condition without reducing too much. On the other hand, if the overload condition is relatively severe, more power reduction by the mobile stations is desirable. The control parameters are selected based upon the desired amount of reduction in mobile station transmission power.

In one example, two control parameters are selected, which control a probability that each mobile station will respond to the common non-serving relative grant. One of the control parameters is referred to as $R_{max}$ in this description. $R_{max}$ corresponds to at least one mobile station uplink data transmission rate at which a response from a corresponding mobile station to the relative grant is desired. In one example, $R_{max}$ corresponds to a maximum allowable uplink data rate for a mobile station. In another example, $R_{max}$ corresponds to a range of rates at which rate control is desired.

Another selected control parameter in one example is referred to as p. In one example μ controls the rate at which power reduction occurs by essentially controlling the number of mobile stations that will respond to the relative grant. In one example, μ is set to be equal to $R_{max}$ or a fraction of $R_{max}$ (e.g., $R_{max}$, $R_{max}/2$, $R_{max}/3$, or $R_{max}/4$).

In one example, the control parameters are selected at the RNC 22 level and communicated to the base station 26 using N-BAP signaling.

Figure 3:
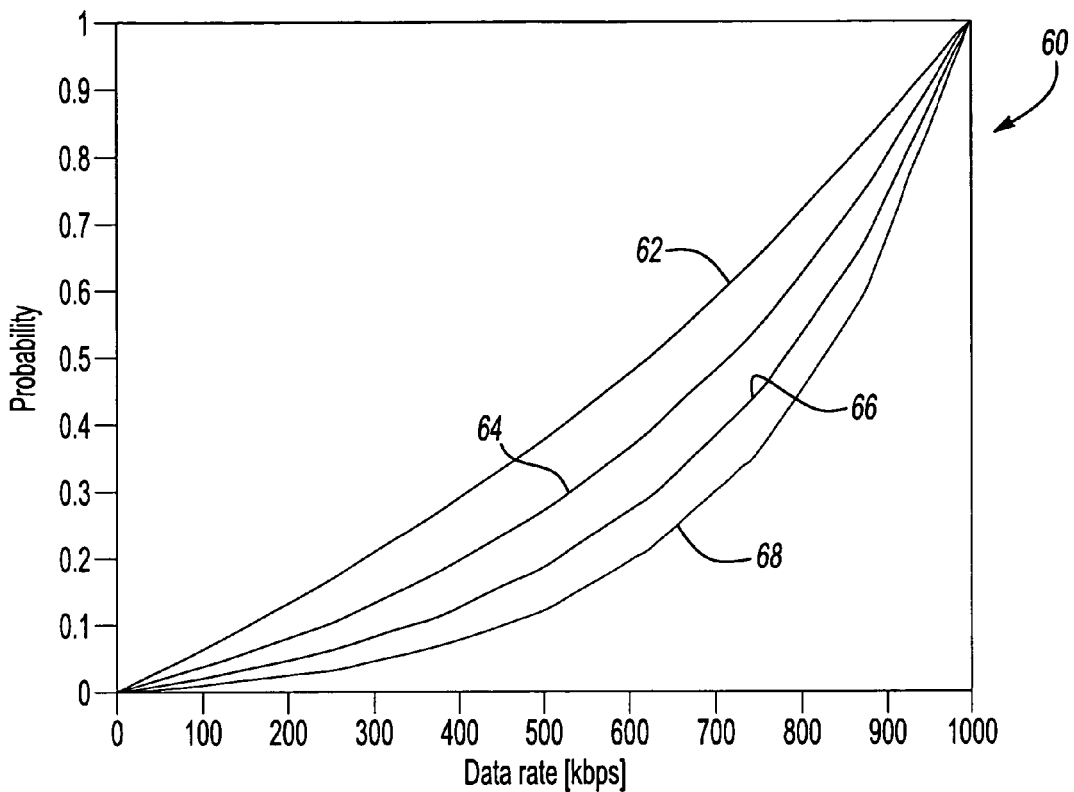
FIG. 3 graphically illustrates an influence of at least one control parameter on a rate of mobile station response to a common rate control command in one example embodiment.

Referring to FIG. 3, the influence of the control parameter μ on the probability that a mobile station will respond to the relative grant is graphically illustrated in a plot 60. The example of FIG. 3 shows the probability that a mobile station will respond to the relative grant compared to the data rate used in uplink transmissions by a particular mobile station. A first plot 62 corresponds to one example where μ is set equal to $R_{max}$, which equals 1024 kilobits per second (kbps). As can be appreciated from the illustration, a mobile station transmitting at a rate of 1024 kbps will have a probability of about 1 (i.e., 100%) that it will respond to the relative grant. A mobile station transmitting at 512 kbps will have about a 0.4 (i.e., 40%) probability of responding to the relative grant. The plots 64, 66 and 68 illustrate the impact of selecting decreasing values of μ, respectively, on the probability that a mobile station will respond to the relative grant. In this example, the plot 64 corresponds to μ being set to $R_{max}/2$, the plot 66 corresponds to μ being set at $R_{max}/3$ and the plot 68 corresponds to μ being set to $R_{max}/4$.

Once the appropriate control parameters (i.e., $R_{max}$ and μ) are selected, they are communicated to base stations and mobile stations by appropriate signaling at 70 in FIG. 2. This involves a single transmission, for example, from the base station 26 to the plurality of mobile stations 30-36 and 42-48. The mobile stations 38 and 40 are rate controlled by the base station 26 so that they are not affected by the non-serving relative grant transmission.

The signaling to the mobile stations communicating the control parameters includes known RRC signaling techniques in one example. In the disclosed example, at least $R_{max}$ and μ are communicated to each mobile station using RRC signaling.

At 72 in FIG. 2, each mobile station receiving the relative grant uses the control parameters $R_{max}$ and μ to determine a probability for responding to the non-serving relative grant. One example includes using statistical rate control and an exponential transmission probability that the mobile station will respond to the relative grant. In one example, the probability P is a function of the uplink data rate "r" of the mobile station as can be appreciated from FIG. 3, for example. One example includes using the relationship:

$$P(r)=K\exp(-r/\mu)-K\exp(-R_{max}/\mu)$$

where r is the data rate of the mobile station;

$R_{max}$ is the selected control parameter indicative of a maximum allowable uplink data rate;

μ is the selected control parameter regarding the rate at which mobile stations should respond to the relative grant; and $K=1/(1-\exp(-R_{max}/\mu))$.

One example includes the mobile station calculating the probability P(r) and determining a corresponding threshold. In one example, the determined probability is the threshold. The mobile station draws a uniformly distributed random number using known techniques. One example includes random numbers from within the range 0 to 1. The random number is compared with the threshold. The mobile station responds to the non-serving relative grant by decreasing the uplink transmit rate using a pre-defined step whenever the threshold exceeds the random number in one example. This occurs at 74 in the example of FIG. 2. If the determined probability or corresponding threshold does not exceed the random number, then the mobile station does not respond to the received relative grant.

Figure 4:
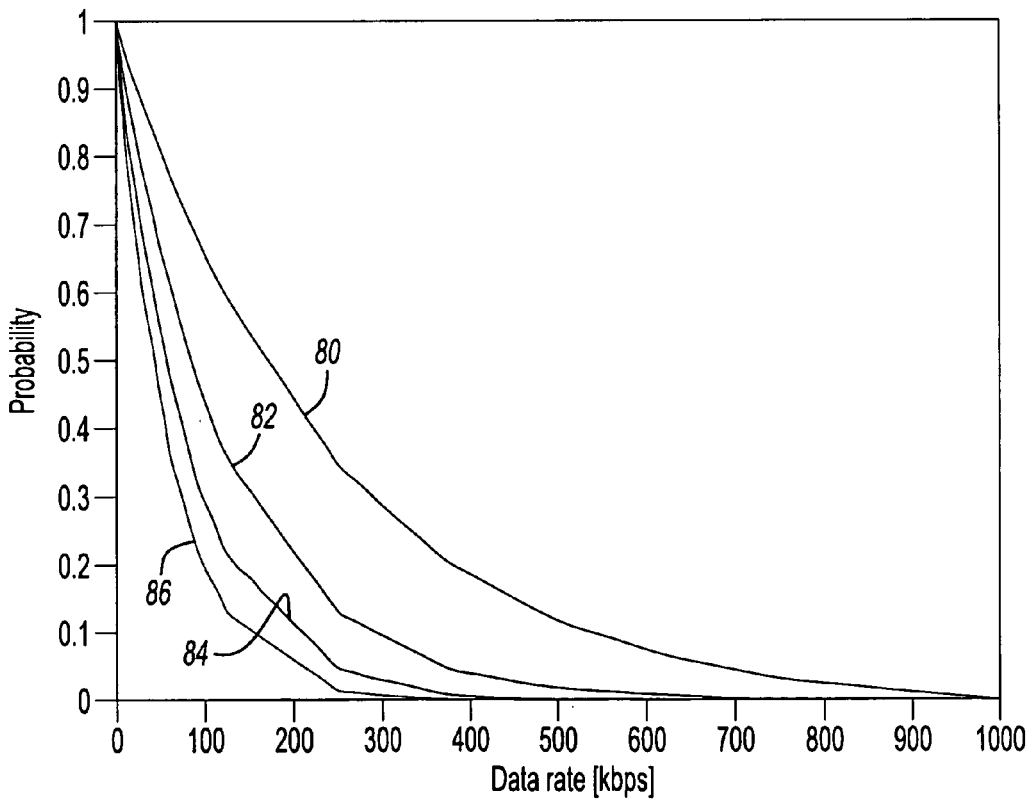
FIG. 4 graphically illustrates an influence of at least one control parameter on a rate of mobile station response to a common rate control command in another example embodiment.

The above example included a common relative grant indicating that at least one mobile station should reduce the transmission rate on an uplink. Another example includes signaling to mobile stations a desire for at least one of them to increase the transmission rate on the uplink. FIG. 4 graphically illustrates a relationship similar to that shown in FIG. 3 but, in this instance, for a common non-serving relative grant using statistical rate control for rate increases. Whether a mobile station will respond depends on the probability P defined by the following equation:

$$P(r)=K\exp(-r/\mu)+1-K$$

where
r is the currently used rate of a mobile station;
$\mu$ is a parameter selected to control a proportion of the mobile stations responding to the relative grant; and
$K=1/(1-\exp(-R_{max}/\mu))$ As can be appreciated in FIG. 4, as the value of $\mu$ decreases, the probability at which mobile stations will respond to the relative grant decreases. In this example, the curve 80 corresponds to a value for $\mu$ equaling $R_{max}/4$ where $R_{max}=1024$ kbps. The curve 82 corresponds to $\mu$ equaling $R_{max}/8$. The curve 84 corresponds to $\mu$ equaling $R_{max}/12$. The curve 86 corresponds to $\mu$ equaling $R_{max}/16$. By selectively controlling the value of $\mu$, for example, it is possible to selectively control a proportion of mobile stations that will respond to the non-serving relative grant.

The disclosed examples provide a technique by which the number of mobile stations responding to a common non-serving relative grant is selectively controlled for controlling the change in uplink transmission rate used by mobile stations, which affects an interference level at a base station, for example. The disclosed examples conserve downlink resources and avoid undesirably large fluctuations in received power at a base station while still achieving necessary rate control to alleviate overload conditions, for example.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of communicating, comprising:
selectively controlling whether a mobile station will respond to a common rate control command that is transmitted to a plurality of mobile stations; and
controlling a probability that the mobile station will respond to the common rate control command wherein the probability comprises $$P(r)=K\exp(-r/\mu)-K\exp(-R_{max}/\mu),$$

where
r is an uplink data rate of the mobile station;
$R_{max}$ corresponds to at least one uplink data rate associated with a response to the common rate control command;
$\mu$ corresponds to a rate of controlling mobile stations using the common rate control command; and $$K=1/(1-\exp(-R_{max}/\mu)).$$

2. The method of claim 1, wherein $R_{max}$ comprises a maximum allowable uplink data rate for the plurality of mobile stations.

3. The method of claim 1, wherein as $\mu$ increases, the number of mobile stations within the plurality of mobile stations that will respond to the common rate control command increases.

4. The method of claim 1, wherein $\mu$ comprises one of $R_{max}$, $R_{max}/2$, $R_{max}/3$ or $R_{max}/4$.

5. The method of claim 1, comprising transmitting selected values of $R_{max}$ and $\mu$, respectively, as at least part of the common rate control command.

6. The method of claim 1, comprising
receiving values of $R_{max}$ and $\mu$; and
responsively determining P(r).

7. The method of claim 6, comprising determining whether to respond to the common rate control command based on the determined P(r).

8. The method of claim 7, comprising
determining whether the determined P(r) is greater than a random number;
responding to the common rate control command if the determined P(r) is greater than the random number; and
not responding to the common rate control command if the determined P(r) is less than the random number.

9. A method of communicating, comprising:
selectively controlling whether a mobile station will respond to a common rate control command that is transmitted to a plurality of mobile stations, wherein the common rate control command comprises a non-serving relative grant; and
controlling a probability that the mobile station will respond to the common rate control command using the relationship $$P(r)=K\exp(-r/\mu)+1-K$$

where
r is a data rate of the mobile station;
$\mu$ is selected to control a rate at which mobile stations will respond; and $K=1/(1-\exp(-R_{max}/\mu))$ where $R_{max}$ is indicative of at least one acceptance mobile station data rate.

10. A method of communicating, comprising:
selectively responding to a common rate control command received at a mobile station; and
determining a probability P for responding to the received common rate control command using the relationship:

$$P(r)=K\exp(-r/\mu)-K\exp(-R_{max}/\mu),$$

where
r is an uplink data rate of the mobile station;
$R_{max}$ corresponds to at least one uplink data rate associated with a response to the common rate control command;
$\mu$ corresponds to a rate of controlling mobile stations using the common rate control command; and $$K=1/(1-\exp(-R_{max}/\mu)).$$

11. A method of communicating, comprising
selecting a value for at least one parameter used for determining a probability that a mobile station will respond to a common rate control command;
transmitting the selected value as part of the common rate control command; and
the selected parameter comprises at least one of $\mu$ or $R_{max}$ and a probability P that a mobile station will respond to the common rate control command is determined by $$P(r)=K\exp(-r/\mu)-K\exp(-R_{max}/\mu),$$

where r is an uplink data rate of the mobile station;
$R_{max}$ corresponds to at least one uplink data rate associated with a response to the common rate control command;
μ corresponds to a rate of controlling mobile stations using the common rate control command; and $K = 1/(1 - \exp(-R_{max}/\mu))$.

* * * * *